E. D. SIMONS.
STUD FOR SNAP FASTENERS.
APPLICATION FILED AUG. 25, 1921.

1,404,552.

Patented Jan. 24, 1922.

Inventor:
Ernest D. Simons
by
Wm. H. Timmel
Attorney.

UNITED STATES PATENT OFFICE.

ERNEST D. SIMONS, OF WATERBURY, CONNECTICUT, ASSIGNOR TO SCOVILL MANUFACTURING COMPANY OF WATERBURY, CONNECTICUT, A CORPORATION OF CONNECTICUT.

STUD FOR SNAP FASTENERS.

1,404,552. Specification of Letters Patent. Patented Jan. 24, 1922.

Application filed August 25, 1921. Serial No. 495,205.

*To all whom it may concern:*

Be it known that I, ERNEST D. SIMONS, a citizen of the United States, residing at Waterbury, in the county of New Haven and State of Connecticut, have invented a certain new and useful Improvement in Studs for Snap Fasteners, of which the following is a full, clear, and exact description.

The object of this invention is to provide an attaching arrangement for the studs of snap fasteners of such character that when the stud is set it is possible to ascertain by externally exposed and visible parts that the operation of setting has been properly performed and that the stud is securely set. In other words, that portion of the attaching element which is deformed or closed down is exposed to view and inspection, and not concealed, and at the same time it presents a symmetrical finish, free from projections; the hole made in the material for the passage of the stud being used to receive the attaching element.

The invention consists of a stud for snap fasteners and the like, having a post rising from a flanged base in which is secured a post-encircling eyelet, the leading end of which extends upwardly in the direction of the head of the stud and adapted to pass through the stud hole in the material to which the stud is to be applied, from back to front, and to be set or closed down upon a washer on the face of the material to set the stud, the deformed or closed down end of the eyelet being exposed to view so that the operator may see whether the eyelet has been properly set and the stud securely attached to the material, as I will proceed to explain and finally claim.

Figure 1:
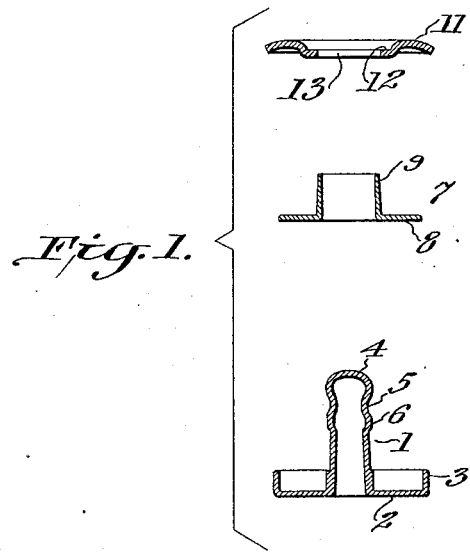
Figure 2:
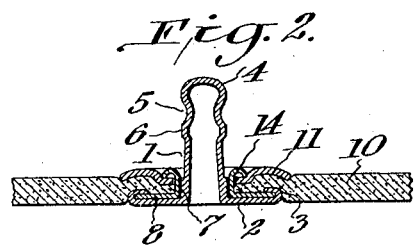

In the accompanying drawings illustrating the invention, in the several figures of which like parts are similarly designated, Figure 1 shows in cross-section the three constituent parts of the stud of this invention. Fig. 2 is a cross-section illustrating the stud set on a piece of material.

In the construction shown in the drawings, the stud comprises a post 1 having a base flange 2 provided with a circumferential rim 3 and a head 4, and a suitable provision, as the groove 5 and bead 6, to engage a complemental member of the snap fastener. 7 is an eyelet, the flange 8 of which fits in the rimmed flange of the post, and has the rim 3 closed down over it, as shown in Fig. 2, in order to make a permanent connection of the eyelet with the base of the stud. The barrel 9 of the eyelet encircles the lower end of the post near its base, and extends upwardly in the direction of the length of the post and towards its head, so that one hole in the material is all that is necessary in order to fasten the post and its attaching medium to the fabric or material or article represented at 10, Fig. 2.

As will be understood, the stud is applied to an article by passing it, head on, through the article from the back so that the post stands off from the face of the article. In setting the stud on such an article, there is employed a washer 11, preferably having a depressed center 12, and this washer is placed on the face of the article and encircles the post. The hole 13 in the washer is large enough for the passage of the leading end of the barrel 9 of the eyelet, and in order to set the stud, this leading end of the eyelet is curled or closed down into the depressed center of the washer 11, as shown at 14 in Fig. 2.

By the construction described, a workman setting such studs on articles may see at once and at a glance whether the operation of setting is perfect, and the eyelet is properly upset or clenched, because this upsetting or clenching is visible externally, and thus any defect compels attention.

In prior constructions it is quite common to reverse this method of eyeletting studs to fabric, the eyelet being a separate element placed around the post on the face side of the article and having its barrel clenched in an appropriately constructed anvil-like base and wholly concealed therein, so that the operator has no way of seeing whether or not the operation has been fully and securely performed, and oftentimes, a defective setting is not apparent until the article has gone to the purchaser, thus creating unfavorable comment.

Again, the symmetrically finished, externally visible and externally accessible attaching element of this invention differs from and is materially better than those fasteners where there are prongs on some portion of the base or other part of the stud which extend through the fabric from face to back, or back to face, and are clenched over a washer or other finishing piece, in that there are no projections or unsightly protuberances visible or exposed and apt to cause damage to the user, or the article on which they are applied. Moreover, the article has to be pierced not only for the passage of the post, but for the passage of each prong, and thus the material is unduly weakened at the point of attachment of the stud and where the greatest strains occur. In the present invention only one hole is made in the article, as already stated, and that hole not only serves for the passage of the post, but also for the passage of the eyelet which constitutes the stud-attaching element.

Variations in details are permissible within the principle of the invention and the claims hereinafter made.

What I claim is:—

1. A stud for snap fasteners, provided with a post and a base from which the post rises, and an eyelet permanently fixed in the base and having its barrel encircling the post and extending in the direction of its length, and a washer adapted to encircle the post on the face side of the article, said eyelet adapted to pass through the stud hole in the article on which the stud is to be set and also through the washer and to be upset, clenched or closed in on the face side of the washer in plain view for inspection purposes.

2. A stud for snap fasteners, provided with a post and a base from which the post rises, and an eyelet permanently fixed in the base and having its barrel encircling the post and extending in the direction of its length and adapted to pass through the stud hole in the material on which the stud is to be set, and a washer adapted to encircle the post on the face side of the article and having a depressed center in which the leading end of the eyelet is to be upset, clenched or closed in to effect the setting of the stud and whereby the upset end is externally visible and in plain view for inspection purposes.

In testimony whereof I have hereunto set my hand this 23d day of August, A. D. 1921.

ERNEST D. SIMONS.

Witnesses:
 PERCY WARNER,
 L. BURTON CHAPMAN.